(12) United States Patent
Dziecielski et al.

(10) Patent No.: US 11,398,159 B2
(45) Date of Patent: Jul. 26, 2022

(54) METHOD AND SYSTEM FOR REDUCING AIRCRAFT FUEL CONSUMPTION

(71) Applicant: The Boeing Company, Chicago, IL (US)

(72) Inventors: Jakub Dziecielski, Gdansk (PL); Piotr Mazur, Gdansk (PL); Jonasz Rudnik, Gdansk (PL); Michal Ruminski, Gdansk (PL); Aleksander Rydzewski, Gdansk (PL)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 16/686,818

(22) Filed: Nov. 18, 2019

(65) Prior Publication Data

US 2021/0150915 A1    May 20, 2021

(51) Int. Cl.
*G08G 5/00* (2006.01)
*G06F 16/29* (2019.01)
*G08G 5/06* (2006.01)

(52) U.S. Cl.
CPC ........... *G08G 5/0043* (2013.01); *G06F 16/29* (2019.01); *G08G 5/0026* (2013.01); *G08G 5/065* (2013.01)

(58) Field of Classification Search
CPC ........... G06F 16/00; G06F 16/29; G08G 5/00; G08G 5/0043; G08G 5/0026; G08G 5/065; G08G 5/0021; G08G 5/0047; G08G 5/04; G08G 5/045; G08G 5/0082
USPC ........................................................ 701/120
See application file for complete search history.

(56) References Cited

U.S. PATENT DOCUMENTS

| | | | |
|---|---|---|---|
| 6,278,965 B1 | 8/2001 | Glass et al. | |
| 8,527,190 B2 * | 9/2013 | Mere | G08G 5/0021 701/120 |
| 10,783,288 B1 * | 9/2020 | Timar | G06Q 50/30 |
| 2016/0210861 A1 | 7/2016 | Donovan | |
| 2016/0343259 A1 | 11/2016 | Ince et al. | |

OTHER PUBLICATIONS

Extended European Search Report prepared by the European Patent Office in application No. EP 20 20 2394.1 dated Apr. 8, 2021.

* cited by examiner

*Primary Examiner* — Anthony R Jimenez
(74) *Attorney, Agent, or Firm* — McDonnell Boehnen Hulbert & Berghoff LLP

(57) ABSTRACT

A method to reduce aircraft fuel consumption includes determining whether a particular aircraft belongs to a runway queue associated with one or more aircraft waiting to take-off from a runway of an airport based on (i) real-time aircraft geographic location information associated with the particular aircraft and (ii) a graph associated with features of the airport. An amount of time the particular aircraft spends in the runway queue before taking off from the runway can be determined. A runway queue take-off delay associated with the runway queue can be determined based at least in part on the amount of time the particular aircraft spends in the runway queue. The runway queue take-off delay can be communicated to a controller terminal of the airport to facilitate routing a different aircraft to a different runway queue associated with a shorter runway queue take-off delay to reduce fuel consumption by the different aircraft.

20 Claims, 15 Drawing Sheets

US 11,398,159 B2

METHOD AND SYSTEM FOR REDUCING AIRCRAFT FUEL CONSUMPTION

FIELD

This application generally relates to aircraft routing at an airport. In particular, this application describes a method and system for reducing aircraft fuel consumption.

BACKGROUND

The cost of aircraft fuel is a significant consideration in the operation of a fleet of aircraft. For example, by some estimates, airlines in the United States collectively consume 17 billion gallons of j et fuel annually.

The majority of aircraft fuel consumption occurs while aircraft are flying. However, an appreciable amount of fuel can be consumed while aircraft are waiting to take off from an airport. For example, aircraft may be consuming fuel while waiting at a gate or while taxiing towards the runway.

Some airports face chronic congestion problems, which results in aircraft spending a considerable amount of time waiting on various taxiways and runway entranceways to take off. The chronic delay can impact aircraft and crew scheduling related to particular aircraft. When considering a fleet of aircraft, time spent in such cases can significantly impact the operating costs of an airline.

SUMMARY

In a first aspect, a computer-implemented method to reduce aircraft fuel consumption is disclosed. The method includes determining, by a computer, whether a particular aircraft belongs to a runway queue associated with one or more aircraft waiting to take-off from a runway of an airport based on (i) real-time aircraft geographic location information associated with the particular aircraft and (ii) a graph associated with features of the airport. The method further includes, responsive to determining that the particular aircraft belongs to the runway queue, determining, by the computer, an amount of time the particular aircraft spends in the runway queue before taking off from the runway. The computer may determine a runway queue take-off delay associated with the runway queue based at least in part on the amount of time the particular aircraft spends in the runway queue. The computer may communicate the runway queue take-off delay to a controller terminal of the airport to facilitate routing a different aircraft to a different runway queue associated with a shorter runway queue take-off delay to reduce fuel consumption by the different aircraft.

In a second aspect, a system to reduce aircraft fuel consumption is disclosed. The system includes a memory that stores instruction code; and a processor in communication with the memory. The instruction code is executable by the processor to perform acts that include determining whether a particular aircraft belongs to a runway queue associated with one or more aircraft waiting to take-off from a runway of an airport based on (i) real-time aircraft geographic location information associated with the particular aircraft and (ii) a graph associated with features of the airport. Responsive to determining that the particular aircraft belongs to the runway queue, the processor determines an amount of time the particular aircraft spends in the runway queue before taking off from the runway. The processor determines a runway queue take-off delay associated with the runway queue based at least in part on the amount of time the particular aircraft spends in the runway queue. The processor communicates the runway queue take-off delay to a controller terminal of the airport to facilitate routing a different aircraft to a different runway queue associated with a shorter runway queue take-off delay to reduce fuel consumption by the different aircraft.

In a third aspect, a non-transitory computer-readable medium is provided. The non-transitory computer-readable medium has stored thereon instruction code executable to perform acts to facilitate a reduction in aircraft fuel consumption. The instruction code is executable by a processor of a computer to perform acts that include determining whether a particular aircraft belongs to a runway queue associated with one or more aircraft waiting to take-off from a runway of an airport based on (i) real-time aircraft geographic location information associated with the particular aircraft and (ii) a graph associated with features of the airport. Responsive to determining that the particular aircraft belongs to the runway queue, an amount of time the particular aircraft spends in the runway queue before taking off from the runway is determined. A runway queue take-off delay associated with the runway queue is determined based at least in part on the amount of time the particular aircraft spends in the runway queue. The runway queue take-off delay is communicated to a controller terminal of the airport to facilitate routing a different aircraft to a different runway queue associated with a shorter runway queue take-off delay to reduce fuel consumption by the different aircraft.

BRIEF DESCRIPTION OF THE FIGURES

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
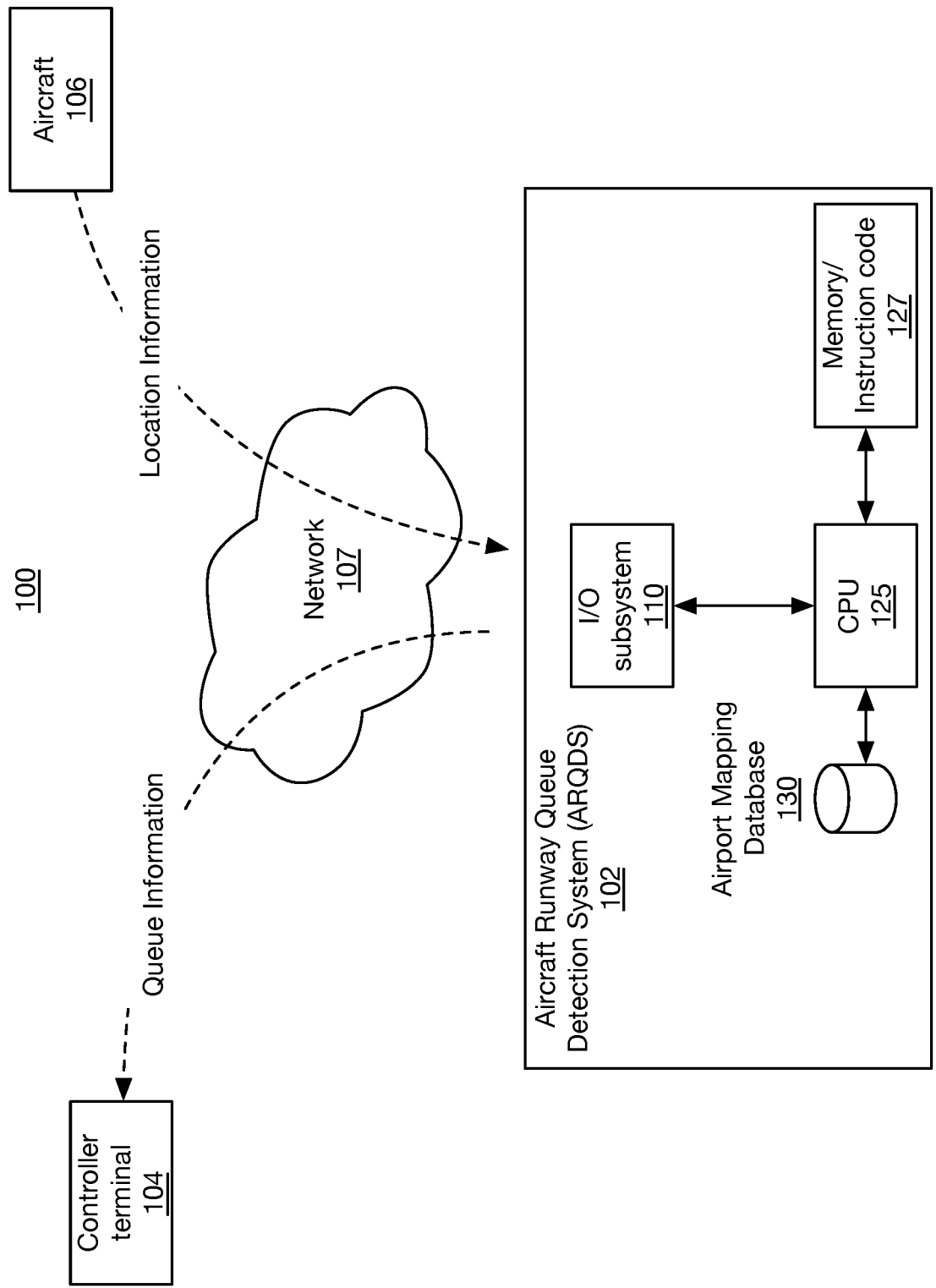
FIG. 1 illustrates an environment that facilitates reducing aircraft fuel consumption, in accordance with an example.

Various examples of systems, devices, and/or methods are described herein. Words such as "example" and "exemplary" that may be used herein are understood to mean "serving as an example, instance, or illustration." Any implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those of ordinary skill in the art, may occur in amounts that do not preclude the effect the characteristic was intended to provide.

To the extent that terms "includes," "including," "has," "contains," and variants thereof are used herein, such terms are intended to be inclusive in a manner similar to the term "comprises" as an open transition word without precluding any additional or other elements.

INTRODUCTION

As noted above, chronic congestion problems at airports result in aircraft spending a considerable amount of time on various taxiways and runway entranceways waiting to take off. When considering a fleet of aircraft, time spent in such cases can significantly impact the operating costs of an airline.

Examples of systems and methods are disclosed herein that address this problem. According to examples, a polygon topology that represents features of an airport is provided. A graph that includes nodes and edges is generated based on the polygon topology. Locations of aircraft on the grounds of the airport are determined in relation to the polygon topology. The polygon topology and the graph are utilized to identify aircraft waiting in a runway queue. The amount of time aircraft spend in the runway queue (i.e., take-off delay) is determined and communicated to air traffic controllers of the airport. The communicated take-off delay associated with the runway queue facilitates routing aircraft to runway queues having a shorter take-off delay.

FIG. 1 illustrates an example of an environment 100 that facilitates reducing aircraft fuel consumption. Illustrated entities of the environment 100 include an aircraft runway queue detection system (ARQDS) 102, a controller terminal 104, and aircraft 106. The various entities of the environment 100 can communicate with one another via a network 107, such as the Internet.

The ARQDS 102 includes a memory device 127 that stores instruction code and a processor 125 that is in communication with the memory device 127. An example of the ARQDS 102 can further include an I/O subsystem 110 and an airport mapping database (AMDB) 130.

The processor 125 executes instruction code stored in the memory device 127 for coordinating activities performed between the various subsystems of the ARQDS 102. As an example, the processor 125 can correspond to a stand-alone processor such as an Intel®, AMD®, or PowerPC® based processor or a different processor. The ARQDS 102 can include an operating system, such as Microsoft Windows®, Linux, Unix®, or another operating system that operates on the processor 125. Operations performed by the ARQDS 102 are describe in further detail below.

The I/O subsystem 110 can include one or more input/output interfaces configured to facilitate communications with entities outside of the ARQDS 102. In this regard, the I/O subsystem 110 can be configured to communicate information using a communication methodology such as, for example, a RESTful API or a Web Service API. In some cases, the I/O subsystem 110 can implement a web browser to facilitate generating one or more web-based interfaces through which users of the ARQDS 102, controller terminal 104, and/or other systems can interact with the ARQDS 102.

The AMDB 130 can store information that specifies the locations of various features of an airport. The information in the AMDB 130 can be specified in Geographic Javascript Object Notation (GeoJSON).

Figure 2:
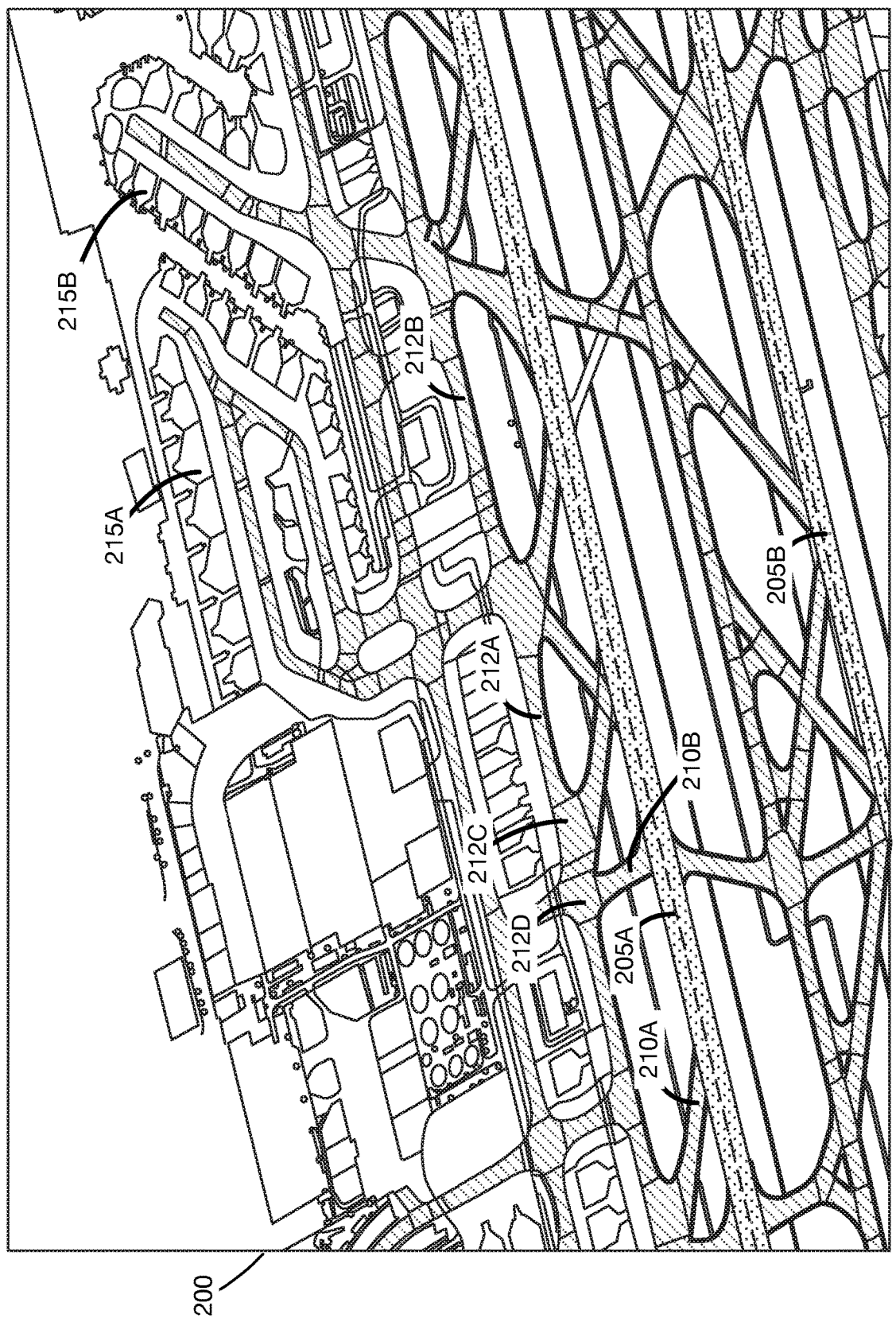
FIG. 2 illustrates a polygon topology that may represent information stored in an airport mapping database of an aircraft runway queue detection system of the environment, in accordance with an example.

FIG. 2 illustrates a polygon topology 200 that can represent information stored in the AMDB 130 of the ARQDS 102. Referring FIG. 2, the polygon topology 200 can specify the spatial layout of an airport. The geometry of features of the airport can be described as points, lines, and polygons. Within examples, polygons 205A and 205B can represent runways of the airport. Polygons 210A and 210B can represent different runway entranceways. Polygons 212A, 212B, 212C, and 212D can represent portions of a taxiway. Polygons 215A and 215B can represent gates of an airport. Other information stored in the AMDB 130 can specify additional aspects of the features, such as surface type, name/object identifier for the features, runway slope, etc.

The controller terminal 104 can correspond to a computer system operated, for example, by an air traffic control operator at an airport. The controller terminal 104 can be located in a control tower of the airport and can be configured to provide real-time status information regarding aircraft on the ground. For example, the controller terminal 104 can depict a map of the airport that shows the relative location of aircraft on the ground.

The aircraft 106 correspond to any aircraft that can be located at the airport, such as commercial jets, passenger jets, helicopters, unmanned aerial vehicles (UAVs), etc. The aircraft 106 can be located on one several runways, taxiways, and runway entranceways. The aircraft 106 can be parked at gates, etc. Particular aircraft 106 can include aircraft location tracking hardware, such as global positioning system (GPS) hardware that facilitates determining the speed and location of the particular aircraft in real-time. The aircraft 106 can further include communication hardware that facilitates communicating the information regarding the speed and location of the aircraft to other entities of the environment, such as the controller terminal 104 and the ARQDS 102. An example of such communication hardware can correspond to an ADS-B (Automatic Dependent Surveillance-Broadcast) transponder.

Figure 3:
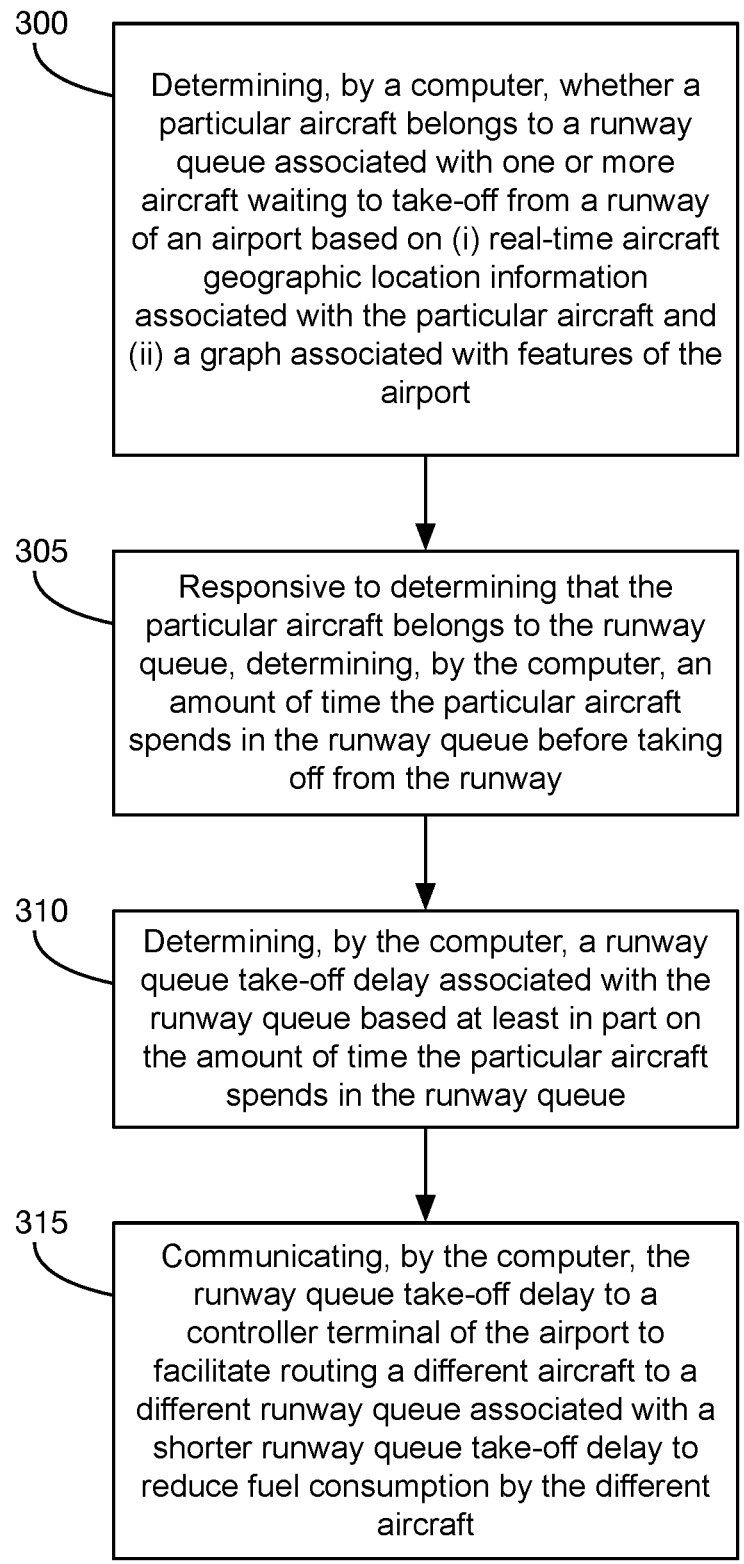
FIG. 3 illustrates a computer-implemented method to reduce aircraft fuel consumption, in accordance with an example.

FIG. 3 illustrates a computer-implemented method to reduce aircraft fuel consumption. The operations of the method of FIG. 2 can be implemented by one or more of the subsystems of the ARQDS 102. In this regard, the memory device 127 can include instruction code that is executed by the processor 125 of the ARQDS 102 to cause the processor 125 to perform, and/or control other subsystems of the ARQDS 102 to perform, the operations.

Referring to FIG. 3, block 300 of the method involves determining, by a computer, whether a particular aircraft belongs to a runway queue associated with one or more aircraft waiting to take-off from a runway of an airport based on (i) real-time aircraft geographic location information associated with the particular aircraft and (ii) a graph associated with features of the airport.

The runway queue corresponds to a group of one or more aircraft that line up to take off from a particular runway. In this regard, each runway of an airport can be associated with a single runway queue. That is, there can be multiple queues at a given airport. The first aircraft in a particular runway queue can be the next aircraft expected to take off from the runway. The second aircraft the runway queue can be expected to take off from the runway after the first aircraft, and so on.

The real-time aircraft geographic location can correspond to GPS information communicated from the aircraft to the ARQDS 102. In some examples, the real-time aircraft geographic location facilitates determining the speed of aircraft. In other examples, the aircraft can communicate speed information along with the GPS information. As noted above, aircraft can include communication hardware (e.g., ADS-B) that facilities communicating the real-time aircraft geographic location to other entities of the environment.

Figure 4:
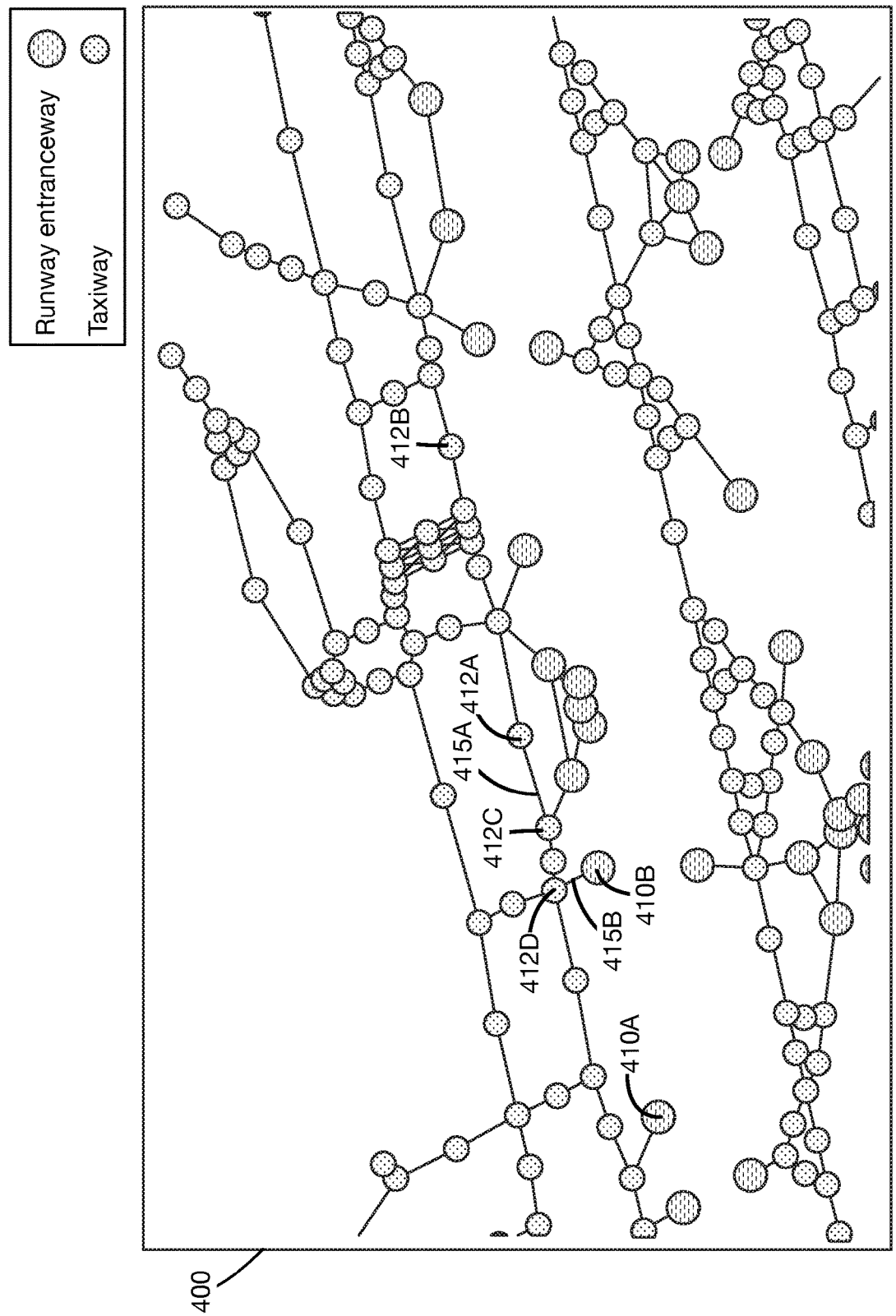
FIG. 4 illustrates an example of a graph that may be utilized in determining whether a particular aircraft belongs to a runway queue, in accordance with an example.

FIG. 4 illustrates an example of a graph 400 that is associated with the polygon topology 200 of FIG. 2. Information in the graph 400 can be utilized by the processor 125 of the ARQDS 102 to determining whether aircraft belong to a runway queue. More specifically, the graph 400 facilitates determining the shortest route and distance between polygons of the polygon topology, which in turn facilitates determining the shortest route and distance between features of the airport, such as taxiways, runway entranceways, runways, etc.

Referring to FIG. 4, the graph 400 includes an arrangement of nodes and edges that are associated with the features of FIG. 2. The nodes correspond to centroids or geometric centers of the polygons of the features of FIG. 2. For example, nodes 410A and 410B correspond respectively to the centroids of polygons 210A and 210B (See FIG. 2), which are illustrated in FIG. 2, which are associated with runway entranceways of the airport. Nodes 412A, 412B, 412C, and 412D correspond respectively to the centroids of polygons 212A, 212B, 212C, and 212D (See FIG. 2), which are associated with a taxiway of the airport. The centroid in a given polygon generally corresponds to the arithmetic mean position of all the points in the polygon. The centroid for each polygon can be computed by the processor 125 using various techniques. An example of one technique implemented by the processor 125 for determining the centroid can involve representing all the points of the polygon as:

$$S=\{(x_1,y_1),(x_2,y_2), \ldots (x_n,y_n)\}$$

The processor 125 can then compute the centroid $C_{x,y}$ of the points in S according to:

$$C_{x,y} = (\bar{x}, \bar{y}) = \left(\frac{1}{n}\sum_{i=0}^{n} x_i, \frac{1}{n}\sum_{i=0}^{n} y_i\right).$$

Edges in the graph connect the centroids of polygons that are connected to one another. For example, edge 415A connects centroids/nodes 412A and 412C, which are associated with polygons 212A and 212C. Edge 415B connects the centroid 412D, which is associated with taxiway polygon 212D, with centroid 410B, which is associated with runway entranceway polygon 210B.

The length of each edge represents the distance between the centroids of related polygons. The length of each edge can be computed by the processor 125 using various techniques. For example, the processor 125 can compute the length of the edge according to the Euclidian distance between centroids of related polygons. Determination of the length of each edge facilitates determining the shortest route and distance between polygons of the polygon topology, which in turn facilitates determining the shortest route and distance between features of the airport, such as taxiways, runway entranceways, runways, etc.

As described in more detail below, the determination of the shortest route and distance between features of the airport facilitates determining whether aircraft are arranged in a runway queue. For example, instantiation of a runway queue can occur when the distance between a particular aircraft and a runway and/or a runway entranceway is below a predefined threshold and/or when the particular aircraft slows or comes to a stop on a runway and/or a runway entranceway.

Figure 5A:
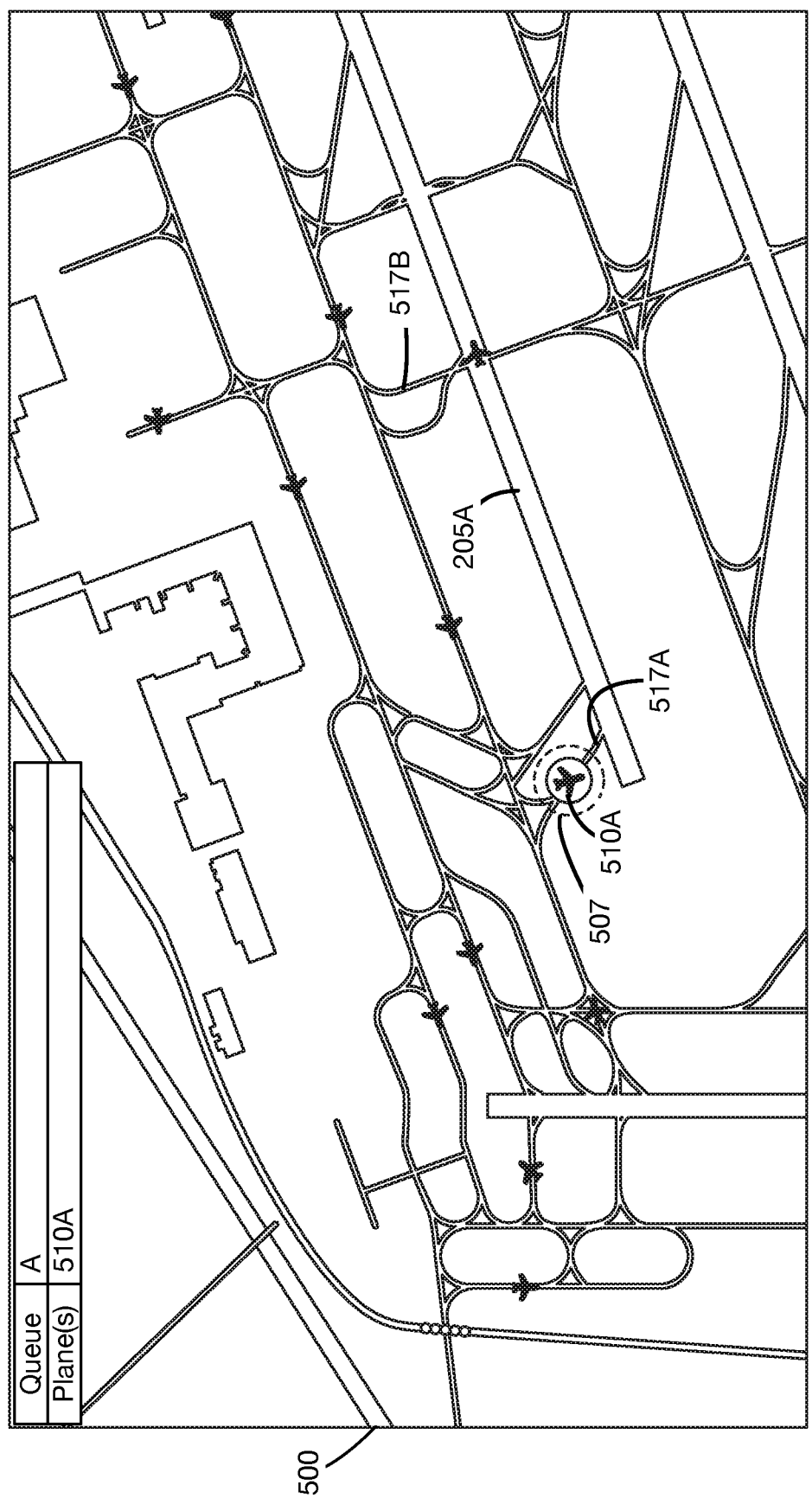
FIG. 5A illustrates an airport map with an instantiated runway queue, in accordance with an example.

FIG. 5A illustrates an airport map with an instantiated runway queue 507. Referring to FIG. 5A, a first aircraft 510A can move into a first runway entranceway 517A of a runway. The first aircraft 510A can move at a speed that is below a threshold such as, for example, 2 knots and/or the first aircraft 510A can come to a complete stop in the first runway entranceway 517A of the runway. The processor 125 can then determine, based on the distance between the first aircraft 510A and the first runway entranceway 517A, and the speed of the first aircraft 510A, that the be the first aircraft 510A is in a runway queue 507 of one or more aircraft that will take off from the runway. That is, the runway queue 507 can be instantiated and initialized with the first aircraft 510A. The instantiated queue is illustrated in the table of FIG. 5A.

Determining that the first aircraft 510A is in the first runway entranceway 517A can involve measuring the distance between the first aircraft 510A and the centroid associated with the polygon in the AMDB that is associated with the first runway entranceway 517A. If the distance is below a threshold (e.g., 100 ft), the first aircraft 510A can be determined to be on the first runway entranceway 517A. In one example, an adapted Dijkstra algorithm can be utilized to measure the shortest route between the first aircraft 510A and the first runway entranceway 517A. For example, in the graph 400, there can be various combinations of paths/edges that connect the polygon associated with the location of the first aircraft 510A and the polygon associated with the first runway entranceway 517A. The adapted Dijkstra algorithm can determine the combination of paths/edges having the shortest overall length. That is, the combination of paths/edges for which the sum of the lengths of all the edges is minimized. The length associated with the combination having the shortest overall length can be considered as the shortest distance between the first aircraft 510A and the first runway entranceway 517A.

In addition or alternatively, the first aircraft 510A can be determined to be within the first runway entranceway 517A if the location of the first aircraft 510A falls within the polygon associated with the first runway entranceway 517A.

Figure 5B:
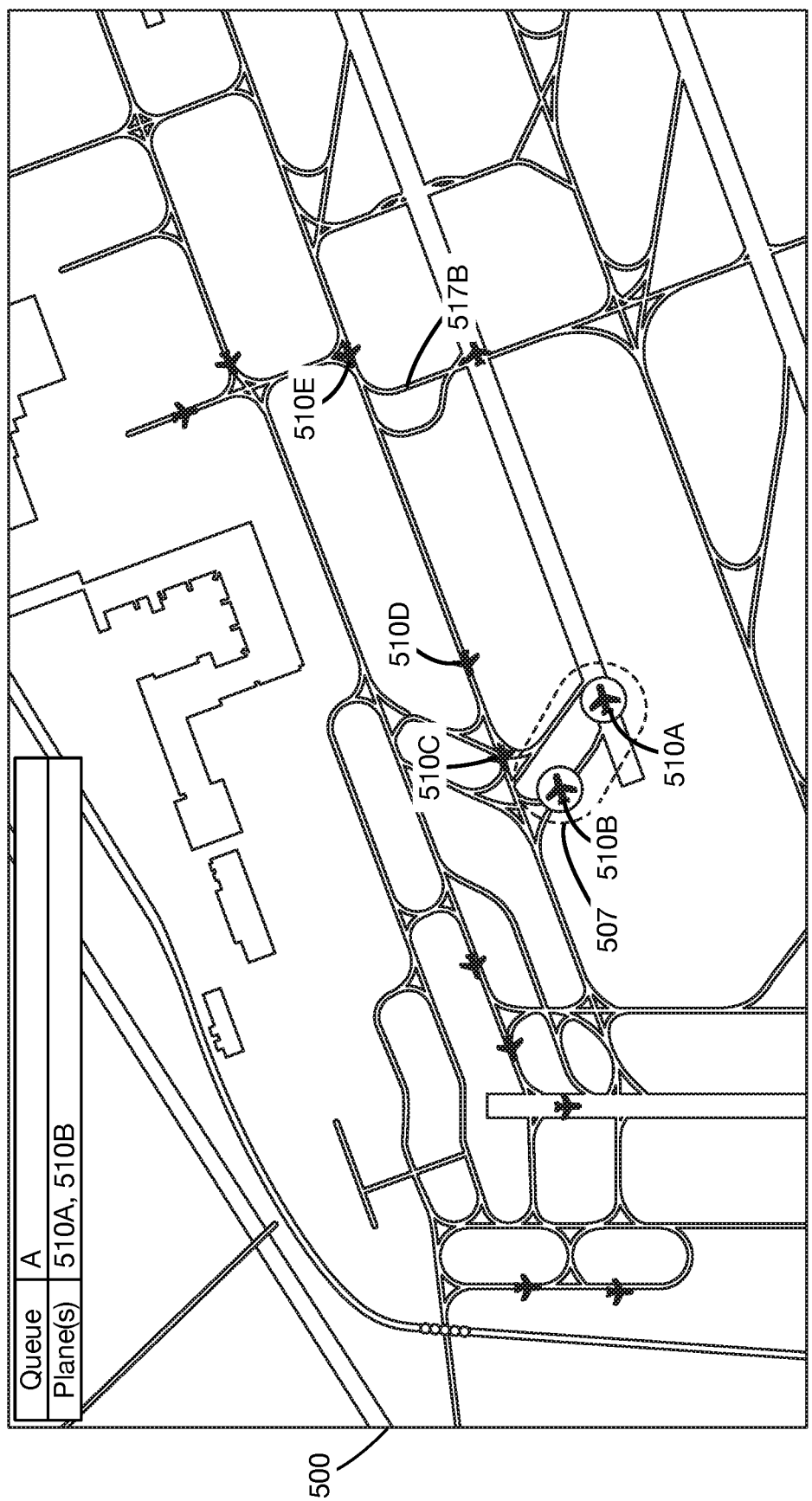
FIG. 5B illustrates the addition of a second aircraft to the instantiated runway queue, in accordance with an example.
Figure 5C:
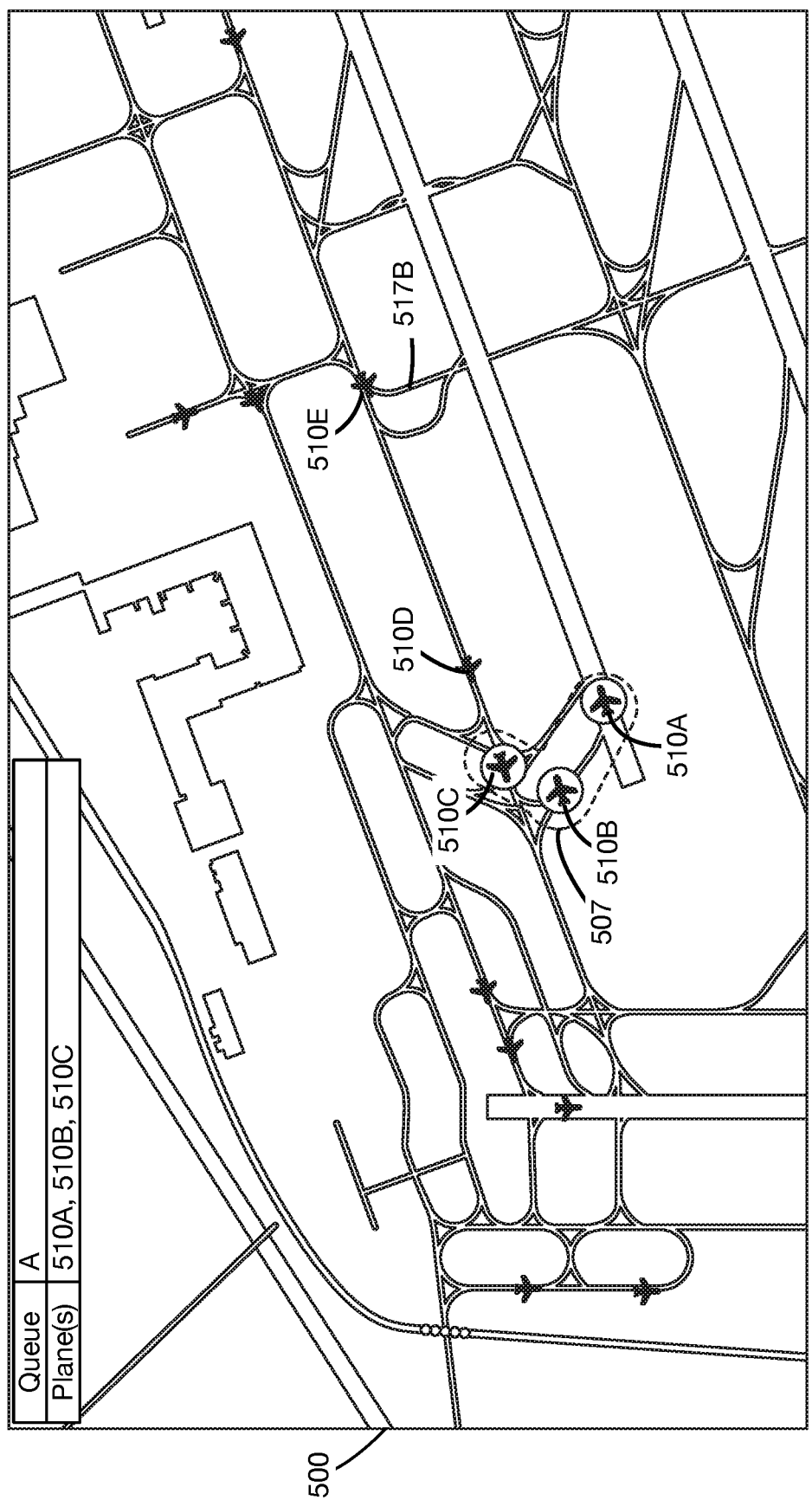
FIG. 5C illustrates the addition of a third aircraft to the instantiated runway queue, in accordance with an example.
Figure 5D:
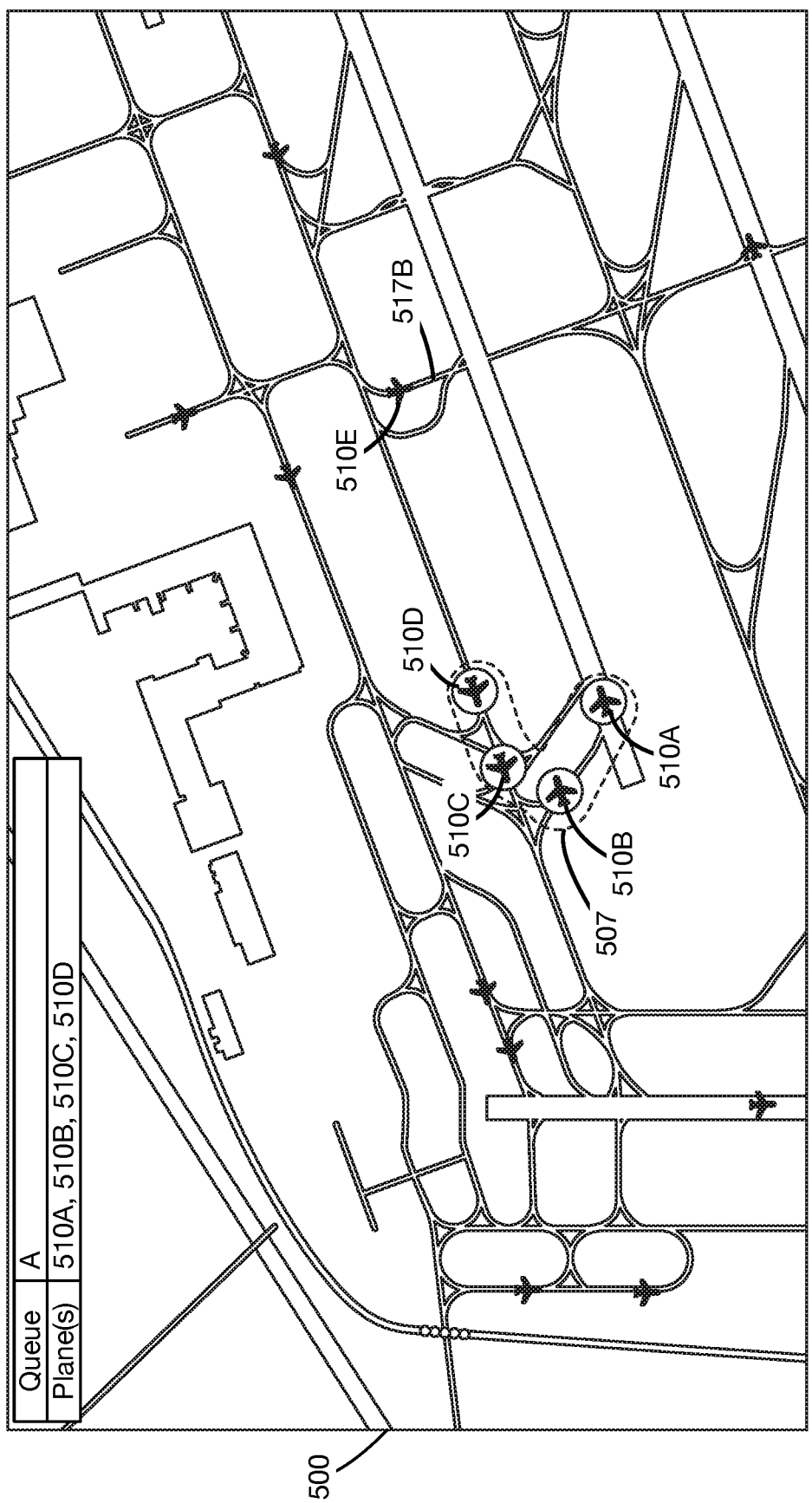
FIG. 5D illustrates the addition of a fourth aircraft to the instantiated runway queue, in accordance with an example.

FIGS. 5B-5E illustrate the addition of aircraft to an instantiated runway queue 507. Referring to FIGS. 5B-5D, in some examples, aircraft can be added to the runway queue 507 when they slow down and/or stop in proximity to other aircraft in the runway queue 507. For example, a second aircraft 510B can be added to the runway queue 507 when the distance between the second aircraft 510B and the first aircraft 510A, previously determined to be in the runway queue 507, is below a threshold, such as 100 ft, and the second aircraft 510B slows or comes to a complete stop. Similarly, a third aircraft 510C can be added to the runway queue 507 when the distance between the third aircraft 510C and the second aircraft 510B, previously determined to be in the runway queue 507, is below a threshold, and the third aircraft 510C slows or comes to a complete stop. A fourth aircraft 510D can be similarly added to the runway queue 507. Adding of the various aircraft to the queue is illustrated in the tables of FIGS. 5B-5D.

Determining the distance between the particular aircraft and aircraft in the runway queue 507 can involve accumulating the length of the edges that connect the centroid associated with the polygon within which the particular aircraft is located, and one or more centroids associated with polygons within which the aircraft in the runway queue 507 are located. For example, the adapted Dijkstra algorithm described above can be utilized to determine the shortest path between the particular aircraft and aircraft in the runway queue 507. When the accumulated length of the edges is below a threshold (e.g., 100 ft), the particular aircraft can be added to the runway queue 507.

Figure 5E:
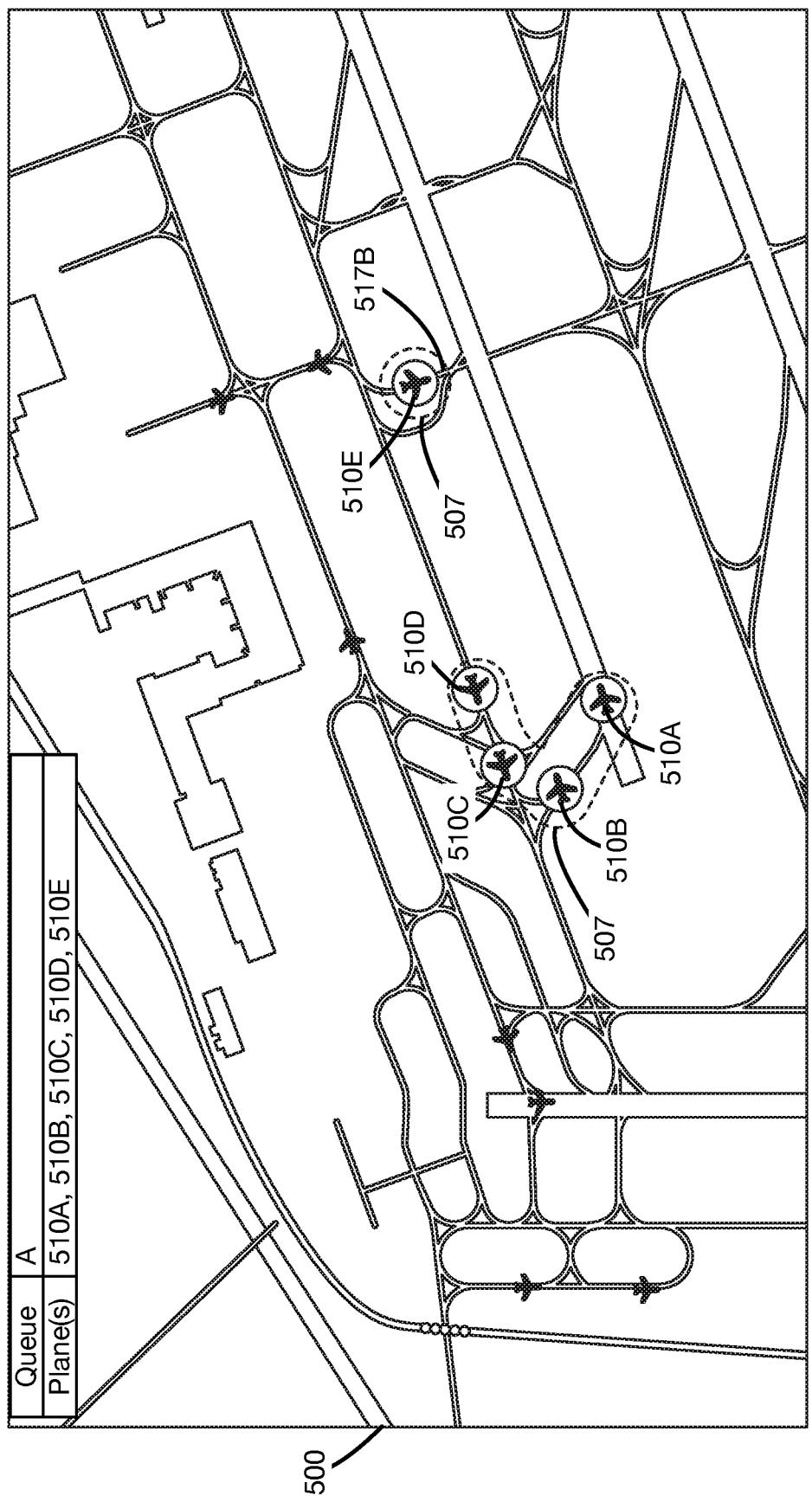
FIG. 5E illustrates the addition of a fifth aircraft to the instantiated runway queue, in accordance with an example.

Referring to FIG. 5E, in some examples, aircraft can be added to the runway queue 507 when they stop in proximity to other runway entranceways. For example, a fifth aircraft 510E can be determined to be stopped within a threshold distance of the second runway entranceway 517B and, therefore, added to the runway queue 507 associated with the runway. The distance can be determined via the adapted Dijkstra algorithm. In addition or alternatively, the fifth aircraft 510E can be determined to be within the second runway entranceway 517B if the location of the fifth aircraft 510E falls within the polygon associated with the second runway entranceway 517B. Adding of the fifth aircraft to the queue is illustrated in the table of FIG. 5E.

Returning to FIG. 3, block 305 involves determining, by the computer and responsive to determining that the particular aircraft belongs to the runway queue 507, an amount of time the particular aircraft spends in the runway queue 507 before taking off from the runway. For example, the processor 125 can measure an elapsed time between a time when a particular aircraft enters the runway queue 507 and a time when the particular aircraft takes off from the runway.

Figure 5F:
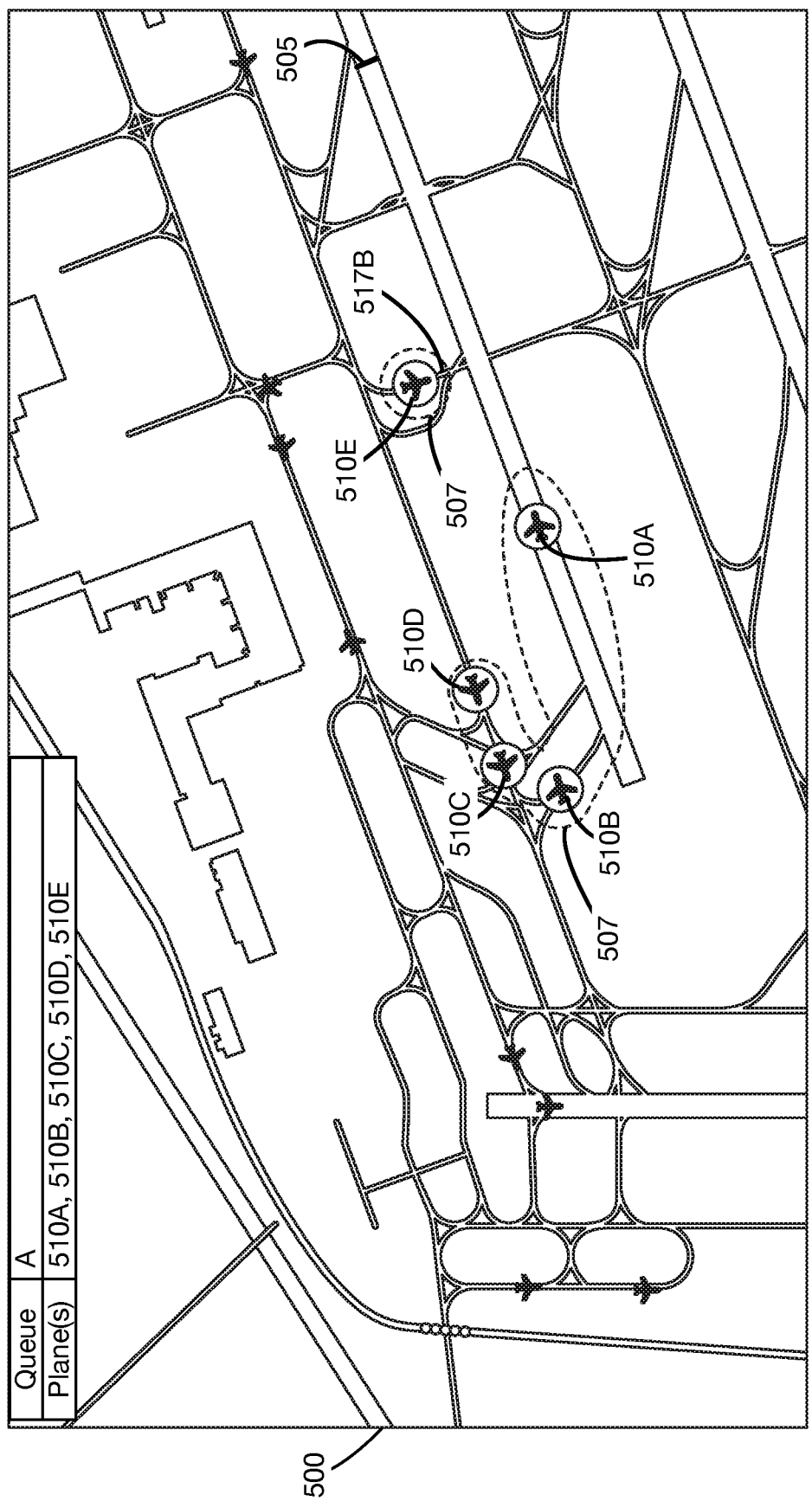
FIG. 5F illustrates the first aircraft taking off from the runway, in accordance with an example.
Figure 5G:
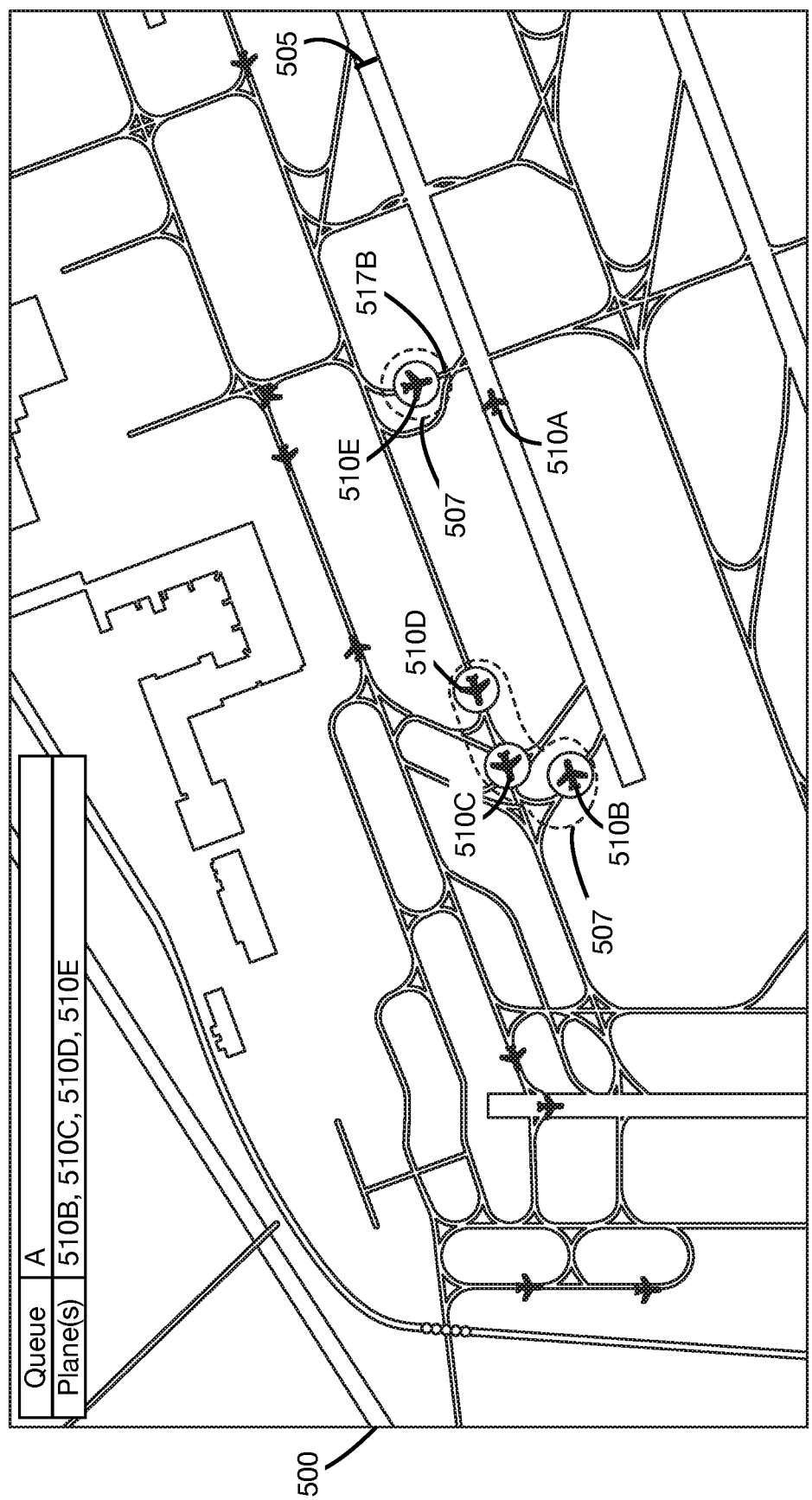
FIG. 5G illustrates the second aircraft moving to the head of the runway queue, in accordance with an example.

The amount of time the first aircraft 510A spends in the runway queue 507 can correspond to the elapsed time between the time the first aircraft 510A was assigned to the runway queue 507, as illustrated in FIG. 5A, and the time at which the first aircraft 510A was determined to have taken off from the runway. For example, the elapsed time between when the first aircraft 510A entered the runway queue 507 and when the first aircraft 510A took off from the runway can be 5 minutes. In this regard, the first aircraft 510A can be considered to have taken off from the runway when the first aircraft 510A is within a threshold distance of an end position 505 of the runway, and/or if the ground speed of the first aircraft 510A exceeds a predefined threshold speed (e.g., 60 knots) that is greater than a typical maximum taxiing speed (e.g., 30-35 knots), as illustrated in FIGS. 5F and 5G. For example, referring to FIG. 5F, the first aircraft 510A can begin moving down the runway, but can still be assigned to the runway queue 507. As shown in FIG. 5G, the first aircraft 510A can be removed from the runway queue 507 when the first aircraft 510A is within a threshold distance of the end position 505 of the runway. For example, the first aircraft 510A can be removed when the first aircraft is within 500 ft of the end position 505 of the runway. After removal of the first aircraft 510A from the runway queue 507, the second aircraft 510B can be moved to the head of the runway queue 507. That is, the second aircraft 510B can be expected to be the next aircraft to take off from the runway. Removal of the first aircraft from the queue is illustrated in the table of FIG. 5G.

Block 310 involves determining, by the computer, a take-off delay associated with the runway queue 507 based at least in part on the amount of time the particular aircraft spends in the runway queue 507. Following the example above, the runway queue take-off delay associated with the runway queue 507 can be determined to be 5 minutes because the first aircraft 510A spent 5 minutes in the runway queue 507.

Figure 5H:
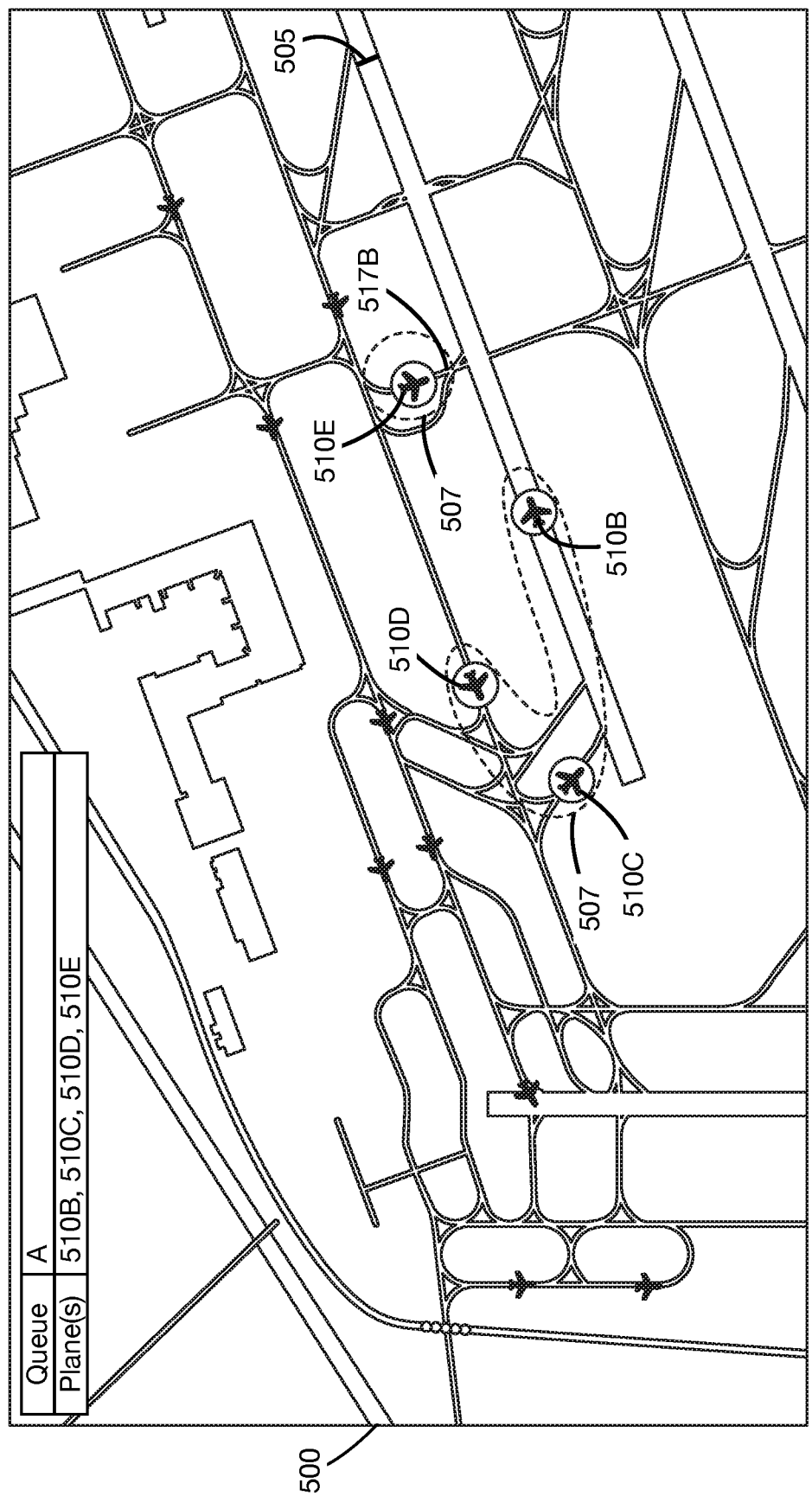
FIG. 5H illustrates the second aircraft taking off from the runway, in accordance with an example.

In some examples, the runway queue take-off delay can correspond to the average of the amount of time aircraft in the runway queue 507 spend in the runway queue 507. For example, FIG. 5H illustrates the second aircraft 510B taking off from the runway. Removal of the second aircraft from the queue is illustrated in the table of FIG. 5H. As soon as the second aircraft 510B is within a threshold distance (e.g., 500 ft) of the end position 505 of the runway and/or the ground speed of the second aircraft 510B exceeds a predefined threshold speed (e.g., 60 knots), the second aircraft 510B can be removed from the runway queue 507. At this point, the elapsed time the second aircraft 510B had spent in the runway queue 507 can be determined to be the time between removal of the second aircraft 510B from the runway queue 507 and the time at which the second aircraft 510B was added to the runway queue 507 (See FIG. 5B). For example, the elapsed time can be 10 minutes. In this case, the average runway queue take-off delay can be determined to be 7.5 minutes, which corresponds to the average time spent by the first aircraft 510A and the second aircraft 510B in the runway queue 507.

Block 315 involves communicating, by the computer, the runway queue take-off delay to a controller terminal 104 of the airport to facilitate routing different aircraft to a different runway queue associated with a shorter runway queue take-off delay to reduce fuel consumption by the different aircraft. For example, the ARQDS 102 can communicate the runway queue take-off delay associated with several runway queues 507 to the controller terminal 104. An air traffic controller at the controller terminal 104 can choose to assign aircraft departing the gates to runway queues 507 having shorter take-off delays. Assigning the aircraft to runway queues 507 having shorter take-off delays results in the aircraft spending less time on the taxiway, which reduces aircraft fuel consumption.

As noted above, aircraft are assigned to an existing and/or new runway queue 507 when they are determined to have stopped or slowed down on a runway entranceway or runway, or when they slow down or stop in proximity to other aircraft previously determined to be in a runway queue 507. In some examples, the runway queue order/sequence in which the aircraft entered the runway queue 507 can be maintained. For example, as noted above, the first aircraft used to instantiate the runway queue 507 can correspond to the first aircraft in the runway queue 507. The runway queue order/sequence of other aircraft entering the runway queue 507 can be set according to a time at which the other aircraft enter the runway queue 507.

Figure 5I:
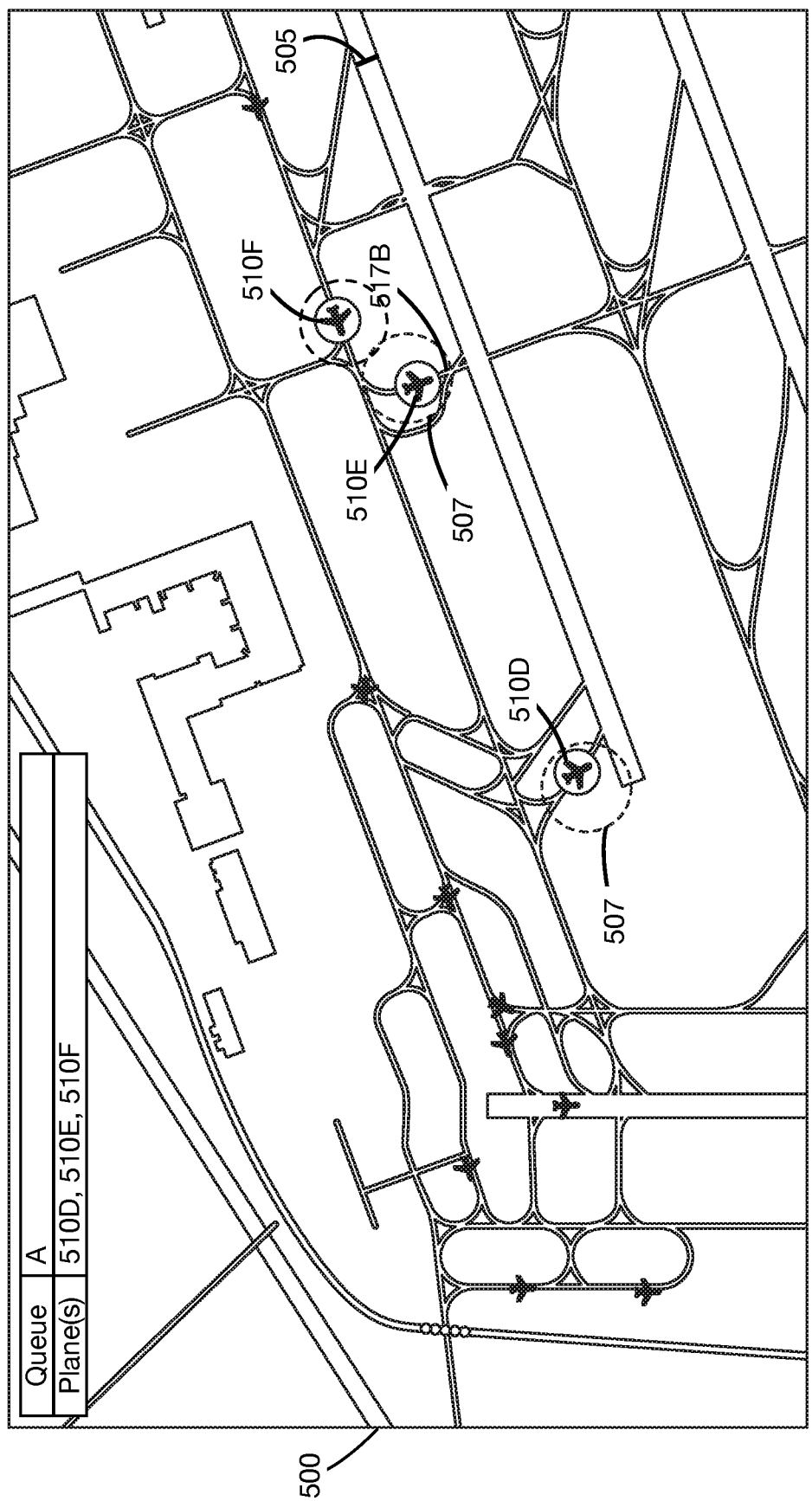
FIG. 5I illustrates the fourth aircraft as being at the head of the runway queue, followed by the fifth aircraft, in accordance with an example.

Referring to FIGS. 5G-5I, the position of a particular aircraft in the runway queue 507 moves as other aircraft in the runway queue take off from the runway. For example, after the first aircraft 510A takes off from the runway, the second aircraft 510B moves to the head of the runway queue 507, as illustrated in FIG. 5G. After the second aircraft 510B takes off from the runway queue 507, the third aircraft 510C moves to the head of the runway queue 507, as illustrated in FIG. 5H. After the third aircraft 510C takes off from the runway queue 507, the fourth aircraft 510D moves to the head of the runway queue 507, as illustrated in FIG. 5I.

FIG. 5I illustrates the fourth aircraft 510D as being at the head of the runway queue 507, followed by the fifth aircraft 510E. In addition, a sixth aircraft 510F is added to the runway queue 507 because the sixth aircraft 510F slows or stops in proximity to the fifth aircraft 510E. The order of the various aircraft in the queue is illustrated in the table of FIG. 5I As noted above, the fifth aircraft 510E was added to the runway queue 507 when the fifth aircraft 510E entered the second runway entranceway 517B, which was after the fourth aircraft 510D was assigned to the runway queue 507. In this scenario, the fourth aircraft 510D would be expected to be the next aircraft to take off from the runway.

Figure 5J:
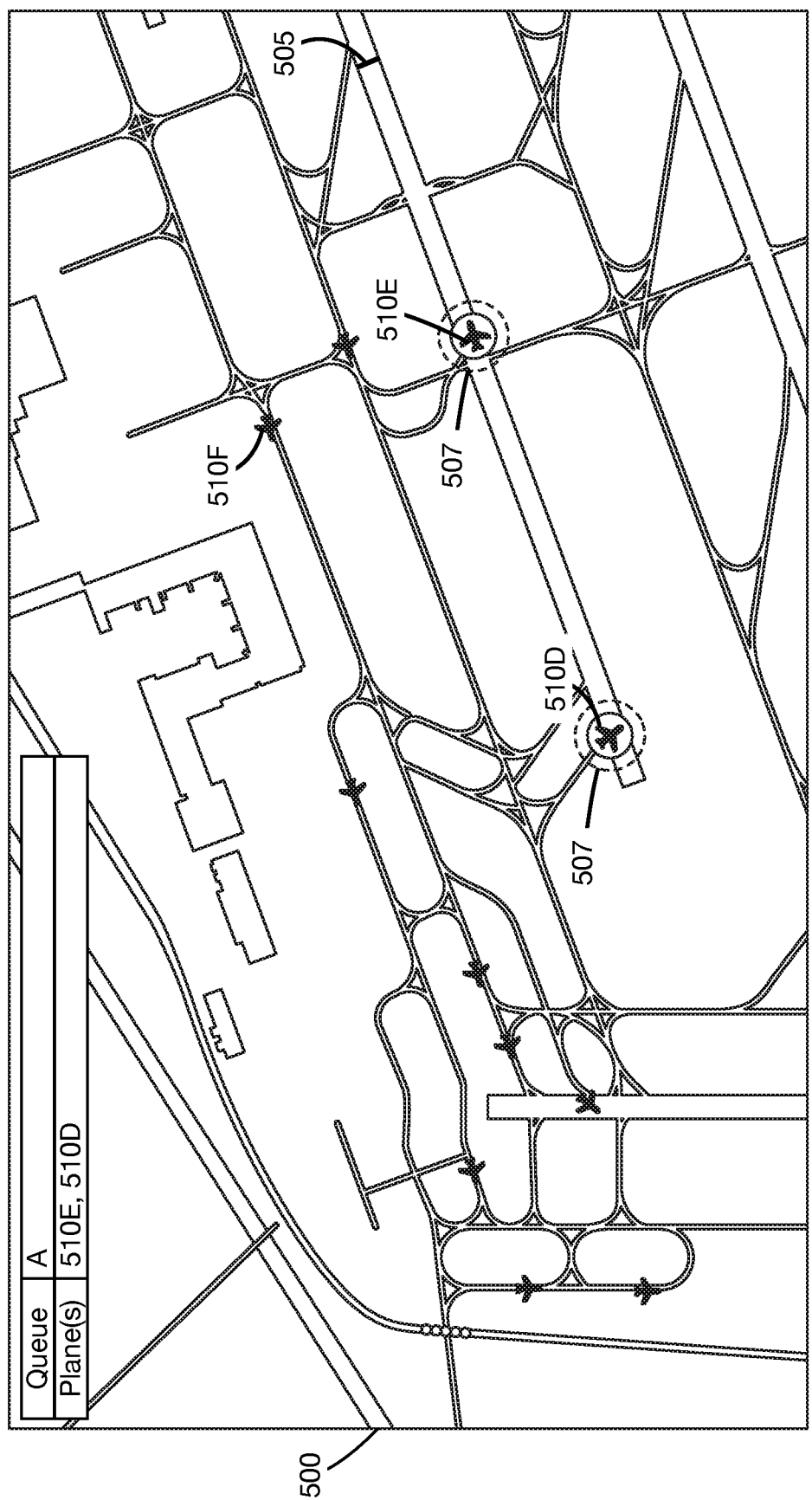
FIG. 5J illustrates the fifth aircraft moving to the head of the runway queue and the fourth aircraft moving to the second position in the runway queue, in accordance with an example.

In some examples, however, an aircraft can be moved to the head of the runway queue 507 after the aircraft moves to the runway. For example, as illustrated in FIG. 5J, the fifth aircraft 510E can be moved from the second position in the runway queue 507 (See FIG. 5I), to the first position in the runway queue 507 and the fourth aircraft 510D can be moved to the second position in the runway queue 507. Additionally, the sixth aircraft 510F can be removed from the runway queue 507 because the sixth aircraft 510F moved away from the runway entranceway in which the fifth aircraft 510E. The swapping of the fifth aircraft and the fourth aircraft within the queue is illustrated in the table of FIG. 5J. The removal of the of the sixth aircraft from the queue is also illustrated in the table of FIG. 5J.

Figure 5K:
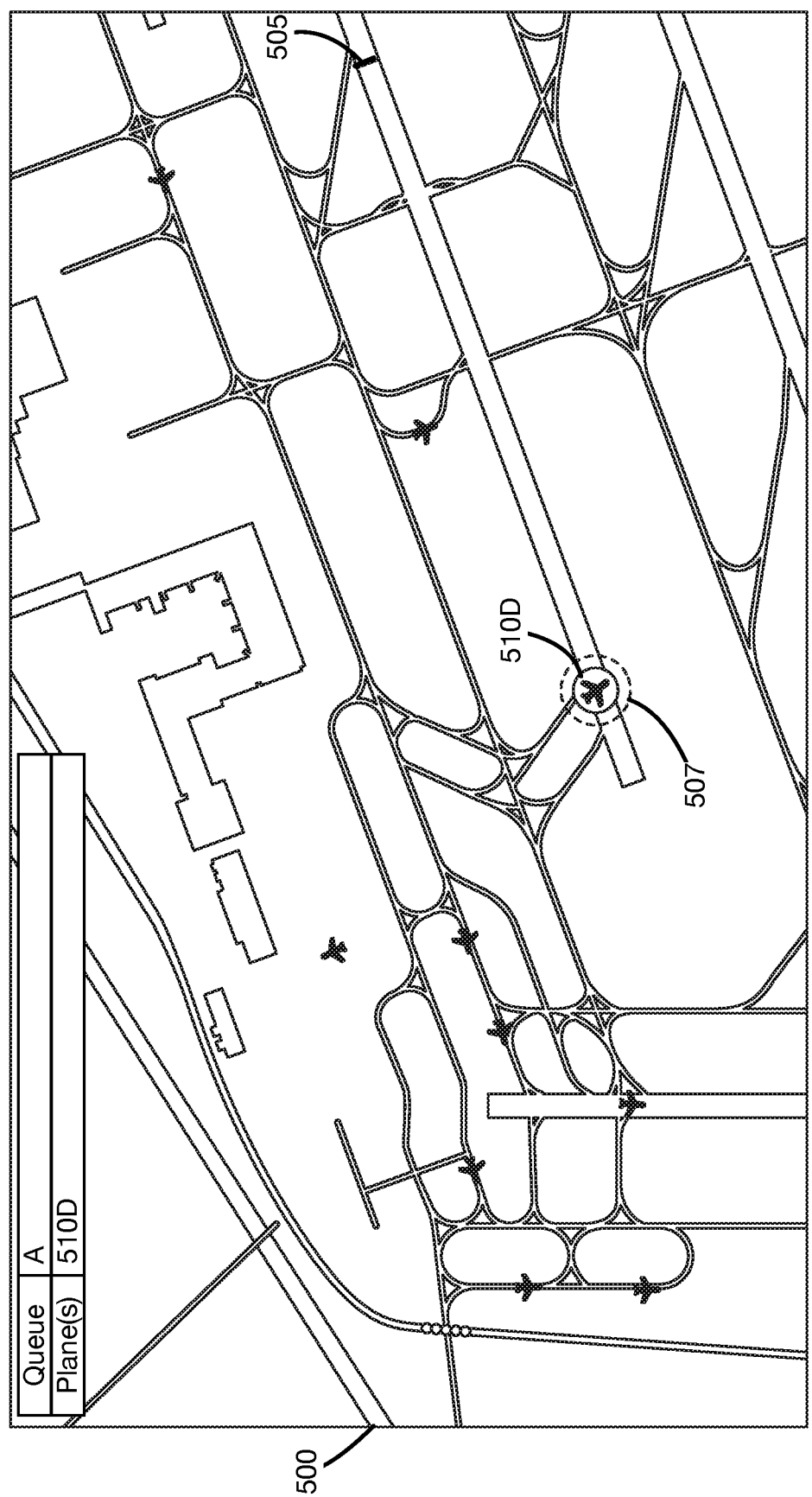
FIG. 5K illustrates the fourth aircraft moving to the head of the runway queue after the fifth aircraft takes off from the runway, in accordance with an example.

In some examples, when two aircraft simultaneously enter the runway, the position of the aircraft in the runway queue 507 can be based on the distance of the aircraft to, for example, the end position 505 of the runway. For example, as illustrated in FIG. 5J, the fourth aircraft 510D and the fifth aircraft 510E appear to enter the runway at the same time. The fifth aircraft 510E is closer to the end position 505 of the runway and, therefore, can be moved to the head of the runway queue 507. After the fifth aircraft 510E takes off from the runway, the fourth aircraft 510D can be moved to the head of the runway queue 507, as illustrated by the table in FIG. 5K.

As previously noted, FIG. 3 illustrates a computer-implemented method to reduce aircraft fuel consumption. Block 300 can involve determining, by a computer, whether a particular aircraft belongs to a runway queue 507 associated with one or more aircraft waiting to take-off from a runway of an airport based on (i) aircraft geographic location information associated with the particular aircraft and (ii) a graph associated with features of the airport.

Block 305 can involve responsive to determining that the particular aircraft belongs to the runway queue 507, determining, by the computer, an amount of time the particular aircraft spends in the runway queue 507 before taking off from the runway.

Block 310 can involve determining, by the computer, a runway queue take-off delay associated with the runway queue 507 based at least in part on the amount of time the particular aircraft spends in the runway queue 507.

Block 315 can involve communicating, by the computer, the runway queue take-off delay to a controller terminal 104 of the airport to facilitate routing a different aircraft to a different runway queue associated with a shorter runway queue take-off delay to reduce fuel consumption by the different aircraft.

In some examples, determining whether the particular aircraft belongs to the runway queue 507 can involve measuring, by the computer, a distance from the particular aircraft to an entrance of the runway; and in response to determining that the distance is below a threshold distance, assigning, by the computer, the particular aircraft to the runway queue 507.

In some examples, determining whether the particular aircraft belongs to the runway queue 507 the method can involve measuring, by the computer, a distance from the particular aircraft to another aircraft of the runway queue 507; and in response to determining that the distance is below a threshold distance, assigning, by the computer, the particular aircraft to the runway queue 507.

In some examples, determining the runway queue take-off delay can involve computing, by the computer, an average of the amount of time at least some of the one or more aircraft spend in the runway queue 507; and setting, by the computer, the runway queue take-off delay associated with the runway queue 507 to be the computed average.

In some examples, determining the amount of time the particular aircraft spends in the runway queue 507 before taking off from the runway can involve measuring, by the computer, an elapsed time between a first time when the particular aircraft enters the runway queue 507 and a second time when the particular aircraft takes off from the runway.

In some examples, determining whether the particular aircraft belongs to the runway queue 507 can involve specifying, by the computer and in the graph, (i) centroids of a plurality of polygons specified in Geographic Javascript Object Notation (GeoJSON) data and (ii) edges between the centroids, wherein the plurality of polygons correspond to geographic outlines associated with the features of the airport; determining a distance between the particular aircraft and the runway queue 507 is based on an accumulated length of one or more edges of the graph that connect a polygon associated with a geographic location associated with the particular aircraft with a polygon associated with the runway queue 507 is below a threshold distance; and responsive to determining the distance to be below a threshold, assigning, by the computer, the particular aircraft to the runway queue 507.

Some examples of the method can involve specifying, by the computer, a runway queue order or sequence within the runway queue 507 for at least some of the one or more aircraft.

Some examples of the method can involve specifying, by the computer, a runway queue order associated with aircraft positioned on the runway to be lower than the runway queue order associated with aircraft positioned either a runway entranceway or a taxiway. That is, the position in the queue of aircraft located on a runway or runway entranceway can be lower than that of aircraft located on taxiway.

Some examples of the method can involve specifying, by the computer, an order within the runway queue 507 of at least some of the one or more aircraft positioned on the runway according to a distance of the at least some of the one or more aircraft positioned on the runway to a particular position of the runway; and specifying, by the computer, the order within the runway queue 507 of at least some of the one or more aircraft positioned on a runway entranceway and at least some of the one or more aircraft positioned on a taxiway according to a time at which the at least some of the one or more aircraft positioned on the runway exit and the at least some of the aircraft positioned on the taxiway are determined to be in the runway queue 507.

Further, the disclosure comprises embodiments according to the following clauses:

Clause 1. A computer-implemented method, comprising: determining, by a computer, whether a particular aircraft belongs to a runway queue associated with one or more aircraft waiting to take-off from a runway of an airport based on (i) aircraft geographic location information associated with the particular aircraft and (ii) a graph associated with features of the airport; responsive to determining that the particular aircraft belongs to the runway queue, determining, by the computer, an amount of time the particular aircraft spends in the runway queue before taking off from the runway; determining, by the computer, a runway queue take-off delay associated with the runway queue based at least in part on the amount of time the particular aircraft spends in the runway queue; and communicating, by the computer, the runway queue take-off delay to a controller terminal of the airport to facilitate routing a different aircraft to a different runway queue associated with a shorter runway queue take-off delay.

Clause 2. The computer-implemented method according to any of the preceding clauses, wherein determining whether the particular aircraft belongs to the runway queue comprises: measuring, by the computer, a distance from the particular aircraft to an entrance of the runway; and in response to determining that the distance is below a threshold distance, assigning, by the computer, the particular aircraft to the runway queue.

Clause 3. The computer-implemented method according to any of the preceding clauses, wherein determining whether the particular aircraft belongs to the runway queue comprises: measuring, by the computer, a distance from the particular aircraft to another aircraft of the runway queue; and in response to determining that the distance is below a threshold distance, assigning, by the computer, the particular aircraft to the runway queue.

Clause 4. The computer-implemented method according to any of the preceding clauses, wherein determining the runway queue take-off delay further comprises: computing, by the computer, an average of the amount of time at least some of the one or more aircraft spend in the runway queue; and setting, by the computer, the runway queue take-off delay associated with the runway queue to be the computed average.

Clause 5. The computer-implemented method according to any of the preceding clauses, wherein determining the amount of time the particular aircraft spends in the runway queue before taking off from the runway comprises: measuring, by the computer, an elapsed time between a first time when the particular aircraft enters the runway queue and a second time when the particular aircraft takes off from the runway.

Clause 6. The computer-implemented method according to any of the preceding clauses, wherein determining whether the particular aircraft belongs to the runway queue further comprises: specifying, by the computer and in the graph, (i) centroids of a plurality of polygons specified in Geographic Javascript Object Notation (GeoJSON) data and (ii) edges between the centroids, wherein the plurality of polygons correspond to geographic outlines associated with the features of the airport; determining a distance between the particular aircraft and the runway queue based on an accumulated length of one or more edges of the graph that connect a polygon associated with a geographic location associated with the particular aircraft with a polygon associated with the runway queue is below a threshold distance; and responsive to determining the distance to be below a threshold, assigning, by the computer, the particular aircraft to the runway queue.

Clause 7. The computer-implemented method according to any of the preceding clauses, further comprising: specifying, by the computer, an order within the runway queue for at least some of the one or more aircraft.

Clause 8. The computer-implemented method according to any of the preceding clauses, further comprising: specifying, by the computer, an order within the runway queue of at least some of the one or more aircraft positioned on the runway to be lower than an order within the runway queue of at least some of the one or more aircraft positioned on a runway entranceway and an order within the runway queue of at least some of the one or more aircraft positioned on a taxiway.

Clause 9. The computer-implemented method according to any of the preceding clauses, further comprising: specifying, by the computer, an order within the runway queue of at least some of the one or more aircraft positioned on the runway according to a distance of the at least some of the one or more aircraft positioned on the runway to a particular position of the runway; and specifying, by the computer, the order within the runway queue of at least some of the one or more aircraft positioned on a runway entranceway and at least some of the one or more aircraft positioned on a taxiway according to a time at which the at least some of the one or more aircraft positioned on the runway entranceway and the at least some of the aircraft positioned on the taxiway are determined to be in the runway queue.

Clause 10. A system, comprising: a memory that stores instruction code; and a processor in communication with the memory, wherein the instruction code is executable by the processor to perform acts comprising: determining whether a particular aircraft belongs to a runway queue associated with one or more aircraft waiting to take-off from a runway of an airport based on (i) real-time aircraft geographic location information associated with the particular aircraft and (ii) a graph associated with features of the airport; responsive to determining that the particular aircraft belongs to the runway queue, determining an amount of time the particular aircraft spends in the runway queue before taking off from the runway; determining a runway queue take-off delay associated with the runway queue based at least in part on the amount of time the particular aircraft spends in the runway queue; and communicating the runway queue take-off delay to a controller terminal of the airport to facilitate routing a different aircraft to a different runway queue associated with a shorter runway queue take-off delay.

Clause 11. The system according to any of the preceding clauses starting from clause 10, wherein the instruction code is executable by the processor to perform acts comprising: measuring a distance from the particular aircraft to an entrance of the runway; if the distance is below a threshold distance, assigning the particular aircraft to the runway queue; and wherein routing the different aircraft to the different runway queue associated with the shorter runway queue take-off delay facilitates a reduction in fuel by the different aircraft.

Clause 12. The system according to any of the preceding clauses starting from clause 10, wherein the instruction code is executable by the processor to perform acts comprising: measuring a distance from the particular aircraft to another aircraft of the runway queue; and if the distance is below a threshold distance, assigning the particular aircraft to the runway queue.

Clause 13. The system according to any of the preceding clauses starting from clause 10, wherein the instruction code is executable by the processor to perform acts comprising: measuring an elapsed time between a first time when the particular aircraft enters the runway queue and a second time when the particular aircraft takes off from the runway.

Clause 14. The system according to any of the preceding clauses starting from clause 10, wherein the instruction code is executable by the processor to perform acts comprising: specifying, in the graph, (i) centroids of a plurality of polygons specified in Geographic Javascript Object Notation (GeoJSON) data and (ii) edges between the centroids, wherein the plurality of polygons correspond to geographic outlines associated with the features of the airport; determining a distance between the particular aircraft and the runway queue based on an accumulated length of one or more edges of the graph that connect a polygon associated with a geographic location associated with the particular aircraft with a polygon associated with the runway queue is below a threshold distance; and responsive to determining the distance to be below a threshold, assigning the particular aircraft to the runway queue.

Clause 15. The system according to any of the preceding clauses starting from clause 10, wherein the instruction code is executable by the processor to perform acts comprising: specifying a sequence within the runway queue for at least some of the one or more aircraft.

Clause 16. The system according to any of the preceding clauses starting from clause 10, wherein the instruction code is executable by the processor to perform acts comprising: specifying an order within the runway queue of at least some of the one or more aircraft positioned on the runway to be lower than an order within the runway queue of at least some of the one or more aircraft positioned on a runway entranceway and an order within the runway queue of at least some of the one or more aircraft positioned on a taxiway.

Clause 17. The system according to any of the preceding clauses starting from clause 10, wherein the instruction code is executable by the processor to perform acts comprising: specifying an order within the runway queue of at least some of the one or more aircraft positioned on the runway according to a distance of the at least some of the one or more aircraft positioned on the runway to a particular position of the runway; and specifying the order within the runway queue of at least some of the one or more aircraft positioned on a runway entranceway and at least some of the one or more aircraft positioned on a taxiway according to a time at which the at least some of the one or more aircraft positioned on the runway entranceway and the at least some of the aircraft positioned on the taxiway are determined to be in the runway queue.

Clause 18. A non-transitory computer-readable medium having stored thereon instruction code, wherein the instruction code is executable by a processor of a computer to perform acts comprising: determining whether a particular aircraft belongs to a runway queue associated with one or more aircraft waiting to take-off from a runway of an airport based on (i) real-time aircraft geographic location information associated with the particular aircraft and (ii) a graph associated with features of the airport; responsive to determining that the particular aircraft belongs to the runway queue, determining an amount of time the particular aircraft spends in the runway queue before taking off from the runway; determining a runway queue take-off delay associated with the runway queue based at least in part on the amount of time the particular aircraft spends in the runway queue; and communicating the runway queue take-off delay to a controller terminal of the airport, wherein the runway queue take-off delay is employable to route a different aircraft to a different runway queue associated with a shorter runway queue take-off delay.

Clause 19. The non-transitory computer-readable medium according to any of the preceding clauses starting from clause 18, wherein the instruction code is executable by the processor of the computer to perform acts comprising: measuring a distance from the particular aircraft to an entrance of the runway; and if the distance is below a threshold distance, assigning the particular aircraft to the runway queue.

Clause 20. The non-transitory computer-readable medium according to any of the preceding clauses starting from clause 18, wherein the instruction code is executable by the processor of the computer to perform acts comprising: measuring a distance from the particular aircraft to another aircraft of the runway queue; and if the distance is below a threshold distance, assigning the particular aircraft to the runway queue. While the systems and methods of operation have been described with reference to certain examples, it will be understood by those skilled in the art that various changes can be made and equivalents can be substituted without departing from the scope of the claims. Therefore, it is intended that the present methods and systems not be limited to the particular example disclosed, but that the disclosed methods and systems include all embodiments falling within the scope of the appended claims.

What is claimed is:

1. A computer-implemented method comprising:
  generating, by a computer, a graph that specifies a plurality of polygons that correspond to geographic outlines associated with features of an airport, and edges that connect the polygons to one another;
  determining, by the computer and based on aircraft geographic location information associated with a particular aircraft, a distance between the particular aircraft and a runway queue based on an accumulated length of one or more edges of the graph that connect a polygon associated with a geographic location associated with the particular aircraft with a polygon associated with the runway queue, wherein the runway queue is associated with one or more aircraft waiting to take-off from a runway of the airport;
responsive to determining that the distance is below a threshold, assigning, by the computer, the particular aircraft to the runway queue;
responsive to assigning the particular aircraft to the runway queue, determining, by the computer, an amount of time the particular aircraft spends in the runway queue before taking off from the runway;
determining, by the computer, a runway queue take-off delay associated with the runway queue based at least in part on the amount of time the particular aircraft spends in the runway queue; and
communicating, by the computer, the runway queue take-off delay to a controller terminal of the airport to facilitate routing a different aircraft to a different runway queue associated with a shorter runway queue take-off delay.

2. The computer-implemented method according to claim 1, wherein determining whether the particular aircraft belongs to the runway queue comprises:
measuring, by the computer, a distance from the particular aircraft to an entrance of the runway; and
in response to determining that the distance is below a threshold distance, assigning, by the computer, the particular aircraft to the runway queue.

3. The computer-implemented method according to claim 1, wherein determining whether the particular aircraft belongs to the runway queue comprises:
measuring, by the computer, a distance from the particular aircraft to another aircraft of the runway queue; and
in response to determining that the distance is below a threshold distance, assigning, by the computer, the particular aircraft to the runway queue.

4. The computer-implemented method according to claim 1, wherein determining the runway queue take-off delay further comprises:
computing, by the computer, an average of the amount of time at least one of the one or more aircraft spend in the runway queue; and
setting, by the computer, the runway queue take-off delay associated with the runway queue as the computed average.

5. The computer-implemented method according to claim 1, wherein determining the amount of time the particular aircraft spends in the runway queue before taking off from the runway comprises:
measuring, by the computer, an elapsed time between a first time when the particular aircraft enters the runway queue and a second time when the particular aircraft takes off from the runway.

6. The computer-implemented method according to claim 1, wherein generating the graph that specifies the plurality of polygons that correspond to the geographic outlines associated with the features of the airport comprises:
receiving Geographic Javascript Object Notation (GeoJSON) data that specifies the plurality of polygons that correspond to the geographic outlines associated with the features of the airport; and
specifying, by the computer and in the graph, (i) centroids associated with the plurality of polygons and (ii) the edges between the centroids.

7. The computer-implemented method according to claim 1, further comprising:
specifying, by the computer, an order within the runway queue for at least one of the one or more aircraft.

8. The computer-implemented method according to claim 1, further comprising:
specifying, by the computer, an order within the runway queue of at least one of the one or more aircraft positioned on the runway that is lower than an order within the runway queue of at least one of the one or more aircraft positioned on a runway entranceway and an order within the runway queue of at least one of the one or more aircraft positioned on a taxiway.

9. The computer-implemented method according to claim 1, further comprising:
specifying, by the computer, an order within the runway queue of at least one of the one or more aircraft positioned on the runway according to a distance of the at least one of the one or more aircraft positioned on the runway to a particular position of the runway; and
specifying, by the computer, a runway queue order associated with aircraft positioned on the runway that is lower than the runway queue order associated with aircraft positioned on either a runway entranceway or a taxiway.

10. A system, comprising:
a memory that stores instruction code; and
a processor in communication with the memory, wherein the instruction code is executable by the processor to perform acts comprising:
generating a graph that specifies a plurality of polygons that correspond to geographic outlines associated with features of an airport, and edges that connect the polygons to one another;
determining based on aircraft geographic location information associated with a particular aircraft a distance between the particular aircraft and a runway queue based on an accumulated length of one or more edges of the graph that connect a polygon associated with a geographic location associated with the particular aircraft with a polygon associated with the runway queue, wherein the runway queue is associated with one or more aircraft waiting to take-off from a runway of the airport;
responsive to determining that the distance is below a threshold, assigning, by the system, the particular aircraft to the runway queue;
responsive to assigning the particular aircraft to the runway queue, determining an amount of time the particular aircraft spends in the runway queue before taking off from the runway;
determining a runway queue take-off delay associated with the runway queue based at least in part on the amount of time the particular aircraft spends in the runway queue; and
communicating the runway queue take-off delay to a controller terminal of the airport to facilitate routing a different aircraft to a different runway queue associated with a shorter runway queue take-off delay.

11. The system according to claim 10, wherein the instruction code is executable by the processor to perform acts comprising:
measuring a distance from the particular aircraft to an entrance of the runway;
when the measured distance is below a threshold distance, assigning the particular aircraft to the runway queue; and wherein routing the different aircraft to the different runway queue associated with the shorter runway queue take-off delay facilitates a reduction in fuel by the different aircraft.

12. The system according to claim 10, wherein the instruction code is executable by the processor to perform acts comprising:
measuring a distance from the particular aircraft to another aircraft of the runway queue; and
when the measured distance is below a threshold distance, assigning the particular aircraft to the runway queue.

13. The system according to claim 10, wherein the instruction code is executable by the processor to perform acts comprising:
measuring an elapsed time between a first time when the particular aircraft enters the runway queue and a second time when the particular aircraft takes off from the runway.

14. The system according to claim 10, wherein generating the graph that specifies the plurality of polygons that correspond to the geographic outlines associated with the features of the airport comprises:
receiving Geographic Javascript Object Notation (GeoJSON) data that specifies the plurality of polygons that correspond to the geographic outlines associated with the features of the airport; and
specifying, in the graph, (i) centroids associated with the plurality of polygons and (ii) the edges between the centroids.

15. The system according to claim 10, wherein the instruction code is executable by the processor to perform acts comprising:
specifying a sequence within the runway queue for at least one of the one or more aircraft.

16. The system according to claim 10, wherein the instruction code is executable by the processor to perform acts comprising:
specifying a runway queue order associated with aircraft positioned on the runway that is lower than the runway queue order associated with aircraft positioned either a runway entranceway or a taxiway.

17. The system according to claim 10, wherein the instruction code is executable by the processor to perform acts comprising:
specifying an order within the runway queue of at least one of the one or more aircraft positioned on the runway according to a distance of the at least one of the one or more aircraft positioned on the runway to a particular position of the runway; and
specifying the order within the runway queue of at least one of the one or more aircraft positioned on a runway entranceway and at least some of the one or more aircraft positioned on a taxiway according to a time at which the at least some of the one or more aircraft positioned on the runway entranceway and the at least some of the aircraft positioned on the taxiway enter the runway queue.

18. A non-transitory computer-readable medium having stored thereon instruction code, wherein the instruction code is executable by a processor of a computer to perform acts comprising:
generating a graph that specifies a plurality of polygons that correspond to geographic outlines associated with features of an airport, and edges that connect the polygons to one another;
determining based on aircraft geographic location information associated with a particular aircraft a distance between the particular aircraft and a runway queue based on an accumulated length of one or more edges of the graph that connect a polygon associated with a geographic location associated with the particular aircraft with a polygon associated with the runway queue, wherein the runway queue is associated with one or more aircraft waiting to take-off from a runway of the airport;
responsive to determining that the distance is below a threshold, assigning, by the computer, the particular aircraft to the runway queue;
responsive to assigning the particular aircraft to the runway queue, determining an amount of time the particular aircraft spends in the runway queue before taking off from the runway;
determining a runway queue take-off delay associated with the runway queue based at least in part on the amount of time the particular aircraft spends in the runway queue; and
communicating the runway queue take-off delay to a controller terminal of the airport, wherein the runway queue take-off delay is employable to route a different aircraft to a different runway queue associated with a shorter runway queue take-off delay.

19. The non-transitory computer-readable medium according to claim 18, wherein the instruction code is executable by the processor of the computer to perform acts comprising:
measuring a distance from the particular aircraft to an entrance of the runway; and
when the measured distance is below a threshold distance, assigning the particular aircraft to the runway queue.

20. The non-transitory computer-readable medium according to claim 18, wherein the instruction code is executable by the processor of the computer to perform acts comprising:
measuring a distance from the particular aircraft to another aircraft of the runway queue; and
when the measured distance is below a threshold distance, assigning the particular aircraft to the runway queue.

* * * * *